United States Patent [19]

Lee

[11] 4,180,207
[45] Dec. 25, 1979

[54] SECURITY MATERIAL AND SECURE DOCUMENT SYSTEM USING SAID MATERIAL

[75] Inventor: Cyril A. Lee, Littlewick Green, England

[73] Assignee: E M I Limited, Hayes, England

[21] Appl. No.: 859,234

[22] Filed: Dec. 9, 1977

[30] Foreign Application Priority Data

Dec. 10, 1976 [GB] United Kingdom ............... 51628/76
Apr. 27, 1977 [GB] United Kingdom ............... 17499/77

[51] Int. Cl.$^2$ .................... G06K 19/08; G09F 3/02; G06K 7/08; G11B 11/10
[52] U.S. Cl. .................................. 235/493; 40/2.2; 235/440; 235/450; 340/146.3 C; 346/74.1
[58] Field of Search ............... 235/450, 451, 493, 440; 340/146.3 C; 40/2.2; 346/74.1

[56] References Cited

U.S. PATENT DOCUMENTS

| | | | |
|---|---|---|---|
| 2,784,392 | 3/1957 | Chaimowicz | 235/493 |
| 2,791,310 | 5/1957 | Jones | 235/493 |
| 3,161,457 | 12/1964 | Schroeder et al. | 346/76 |
| 3,465,307 | 9/1969 | Schmidt | 235/493 |
| 3,505,501 | 4/1970 | Ruddock et al. | 235/493 |
| 3,560,715 | 2/1971 | Akamatsu et al. | 235/499 |
| 3,998,160 | 12/1976 | Pearce | 235/493 |
| 4,023,204 | 5/1977 | Lee | 235/493 |
| 4,044,231 | 8/1977 | Beck et al. | 235/493 |

FOREIGN PATENT DOCUMENTS 1263991 2/1972 United Kingdom .
1331604 9/1973 United Kingdom .

*Primary Examiner*—Daryl W. Cook
*Attorney, Agent, or Firm*—Fleit & Jacobson

[57] ABSTRACT

A secure document is produced by securely attaching to a support a body of including a security feature and having a shape which conveys information to the eye. For example the body is a layer of magnetizable material having apertures of letters, numbers and the like. The document can be examined by both magnetic and optical examination apparatus to cross-check that no alteration has been made. A method of making a secure document and examination apparatus is also described. The security feature may be a pattern of magnetic anisotropy fixed into the material.

19 Claims, 10 Drawing Figures

SECURITY MATERIAL AND SECURE DOCUMENT SYSTEM USING SAID MATERIAL

This invention relates to security materials and secure documents including such materials. Secure documents include those documents which represent a sum of money, such as a bank note; or identify the bearer, such as a passport; or operate a machine, such as a cash dispenser card. Such a document may be in the form of a sheet, a card or a book and of paper or plastics or other material. A secure document which is related to the bearer and is intended to identify him, e.g. an identity card or passport, clearly must have some information that is personal to the bearer. This information has to be applied to the secure document accurately and easily and be in a secure form to be resistant to fraudulent or inadvertent imitation or alteration.

Security materials have been proposed in which a body of magnetic material, such as a layer of gamma iron oxide ($Fe_2O_3$) is formed with a permanent pattern of a magnetic property. One technique for making such a layer is by the selective energisation of at least one magnetic head acting on a web bearing an unset dispersion of oxide to align the acicular oxide particles in the unset dispersion in two directions at right angles in respective parts of the layer to form the pattern (of U.K. Pat. No. 1331604). By such techniques, which can be applied during a conventional magnetic tape manufacturing process, it is possible to produce a tape in which successively prepared sections of layer have different permanent patterns. For example if each one of a group of people is to have a personally distinct secure document, say a pass card, then each section could be permanently structured with respective individual information. However, such techniques, while effective where a large number of such sections of similar or different form are required at one time, do have limitations if, for example, only one or a few sections with a distinct or individual pattern are required at a time. Furthermore, care has to be taken to ensure that the right section is placed on the individual documents to correspond with written information etc., while corrections or changes are not easily dealt with. U.S. Pat. No. 3,998,160, assigned to the assignee of the present Application, discloses the use of printing ink loaded with alignable magnetisable particles. The ink is applied with a printing arrangement on which the ink can be exposed to a magnetic field to align the particles in a desired pattern which is maintained when the ink dries after printing on a carrier.

It is an object of the invention to provide security material and techniques for the production of secure documents using security material.

According to the invention there is provided a secure document of a support and secured thereon a body of security material of a layer of anisotropic magnetisable material having fixed therein a detectable pattern of the anisotropic property of the material said layer having a form which represents information both in a magnetically detectable and eye visible manner.

The form may be alpha numeric characters or other eye readable graphic forms. The forms may be defined by the separate security material parts having the shapes of characters or by apertures in the security material part or parts which define a character shape.

The security material may be a magnetic material and may be gamma iron oxide, ($Fe_2O_3$) or other ferro-magnetic material. The magnetic material may be anisotropic, e.g. of acicular form to possess shape anisotropy.

The body of security material may be derived from a layer of security material which has a magnetic property pattern security feature such as a pattern of anisotropic material alignment or regions of materials of different coercivity.

According to the invention there is provided a method of applying security material to a support in a form which represents information including
    providing a source of selectively releasable security material having a security feature of a detectable pattern of a magnetic material property,
    applying a data recording element to the security material source to release material from the source in the form of said element,
    securely bonding at least one of the released material form and the matching remaining material form in the source to a respective support,
thereby to produce a secure document having data securely represented by the material form on the support, the material itself including said security feature.

When both the released form and the remaining form are applied to respective supports one supported form may be issued to a user as a secure document and the other matching supported form retained for checking purposes, the matching form also including the security feature.

The data recording element may have an arbitrary shape, e.g. a bar, to produce a similarly shaped region of security material on the support. The material may be magnetic material. The material may be in a source in the form of a magnetisable material layer having a permanently structured magnetic property pattern.

The source of security material may be a layer of magnetisable material having magnetically anisotropic particles in a set binder on a carrier the easy axis of magnetisation of the particles being aligned in selected areas of the layer in a distinct selected direction, the selected directions forming a remanence variation pattern which is the security feature.

The elemental shape may be released by heat. The heat may be provided by the data recording element. The data recording element may bond the material form by the hot blocking techniques.

The data recording element may have a distinct shape from a set of such shapes, e.g. the alpha-numeric shapes, or other graphic forms and the distinctly shaped magnetised regions may be distinctly detectable by reading apparatus from their distinct shape or from apertures of distinct shapes.

The data recording element may also make a magnetic recording in conventional form in or adjacent the released element.

The invention further provides a secure document including a layer of magnetisable material having a security feature with apertures in the form of alpha-numeric characters representing information to be recorded securely on the document.

The security feature may be an information pattern identifying the source of the magnetisable material layer e.g. forming at least one of a serial number, maker's mark, an issuing agency identification and a clock pulse record.

The secure document may include in association a magnetic record material and a visual record material, with association ensures corresponding appropriate records in both materials.

The invention also provides a recording apparatus including means to transport a support material and a security material source through the apparatus to a recording location, means to apply a distinct shape to the security material source at said location, means to heat the source in the region of said shape and release, transfer and attach material from the source to the support in said shape and means to transport the support and attached material shape from said location.

The apparatus may include a character printer with dies or print elements of various shapes and heatable to heat the source.

Embodiments of the invention will now be described with reference to the drawings in which.

Figure 1:
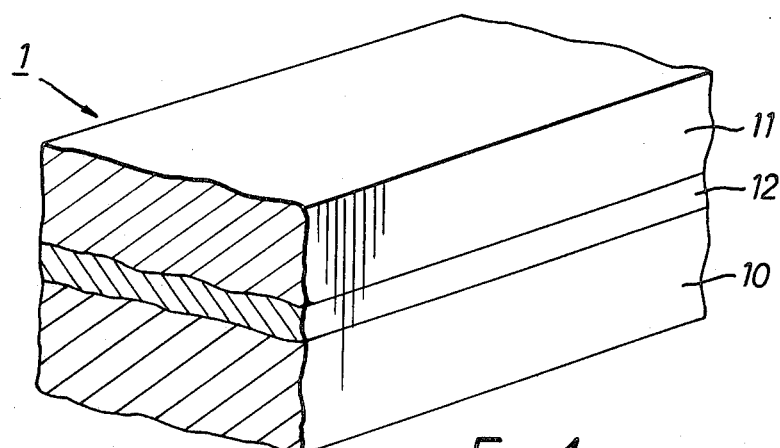
FIG. 1 shows a portion of a secure document recording medium.

FIG. 1 shows a portion 1 of a recording medium in the form of a length of tape. The tape has a flexible substrate 10 of polyvinyl chloride or polyvinyl acetate or other plastics material suitable to withstand brief exposure to a high temperature which may be as much as 130° C. A layer 11 is of a dispersion of magnetisable material particles, eg a magnetic oxide, in a binder such as is well known in the tape manufacturing art. The binder is formulated so that the layer 11 is released from the substrate on the application of appropriate heat and if required, pressure. Alternatively a suitable interlayer, shown dotted at 12, may be used which forms a bond released on heating. Such an interlayer is known in the art. A polyester resin is one suitable material to aid release. Specific examples of such a medium are as follows:

EXAMPLE I

A plastics film of polyethylene-terapthalate, eg the proprietory material MYLAR (R.T.M.) some 15-50 micrometers thick is coated with a layer of a dispersion of chromium dioxide particles in a suitable binder, for example an acrylic thermosetting binder, to a final thickness of some 14 micro meters. The coated film is prepared using conventional techniques, eg a trough coater, and dried and slit to form rolls of tape some 10-15 mm wide.

EXAMPLE II

A film of a polyimide plastics material some 40 micrometers thick is coated with a layer of a dispersion of fine particles of barium ferrite in a high temperature binder to a finished thickness of some 10 micrometers.

The ferrite has a coercivity of some 4000/Oe at room temperature, c15° C.

The film is coated and made into tape as described in Example I.

Such prepared tapes are suitable for hot stamping or laminating on to a card material, such as a copolymer of polyvinyl chloride and polyvinylacetate, provided the temperature of 100° C. for Example I and 200 ° C. for Example II are not exceeded. Clearly other forms of medium may be constructed. The medium may be in or on formats other than tape, and may be suitable for transfer of the magnetic material to sheets of paper of cardboard or other materials.

In particular the magnetic material can be acted on when mobile to form a permanent magnetic structure, eg a pattern of particle alignment as described in U.K. Pat. No. 1331604, or various magnetic materials of different properties can be combined, eg as U.K. Pat. No. 1263991, to form the security material.

The recording of information on a medium according to the invention will now be described.

One convenient form of recording apparatus includes what is basically a typewriter or other impact character printer in which a type die or print head is heatable to say 150° C. or 350° C. An apparatus is described in U.K. Pat. No. 973,200 (U.S. Pat. No. 3,161,457) in which selected elements of a matrix can be heated to mark appropriately a thermally sensitive material. However this apparatus merely touches the strip of material as it passes and does not strike against it or cause any part to be released. The invention provides that at the printing location of such an apparatus or other suitable apparatus heat can be generated to cause the release of a portion of the medium of a desired shape and pressure applied for attachment to a support. Preferably the material remaining around the released portions is attached to a separate support.

In operation to record data by placing portions of magnetic material on a support the support and medium are brought to the recording location by suitable, well-known, transport means, at which location an appropriate character is applied to heat the medium in the shape of the character to bring about the release of a character-shaped portion of material from the medium and press it on to the support to be retained there. The character form maybe of solid or outline form.

Figure 2:
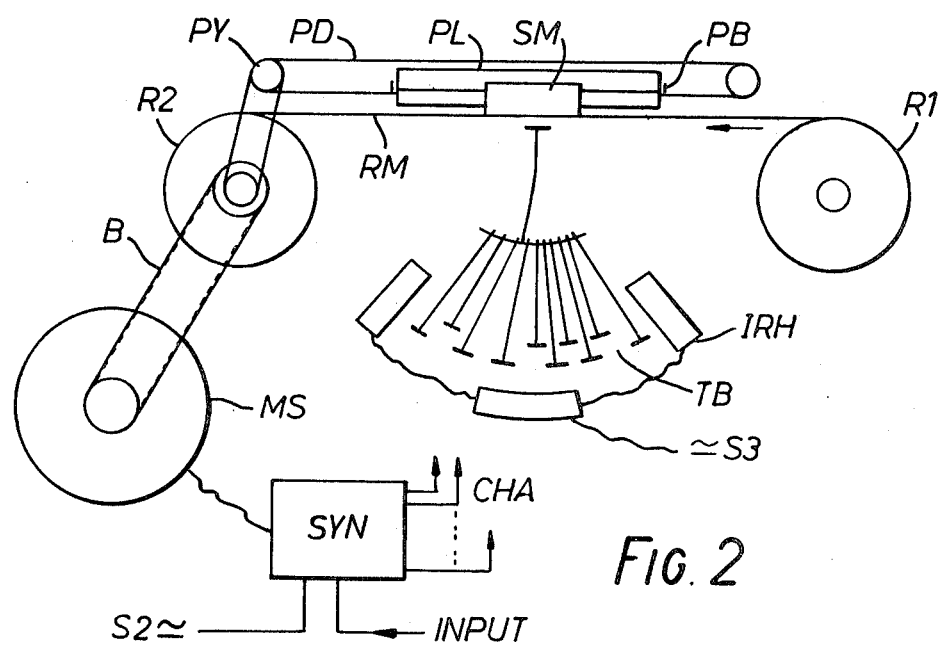
FIG. 2 shows a recording apparatus.
Figure 3:
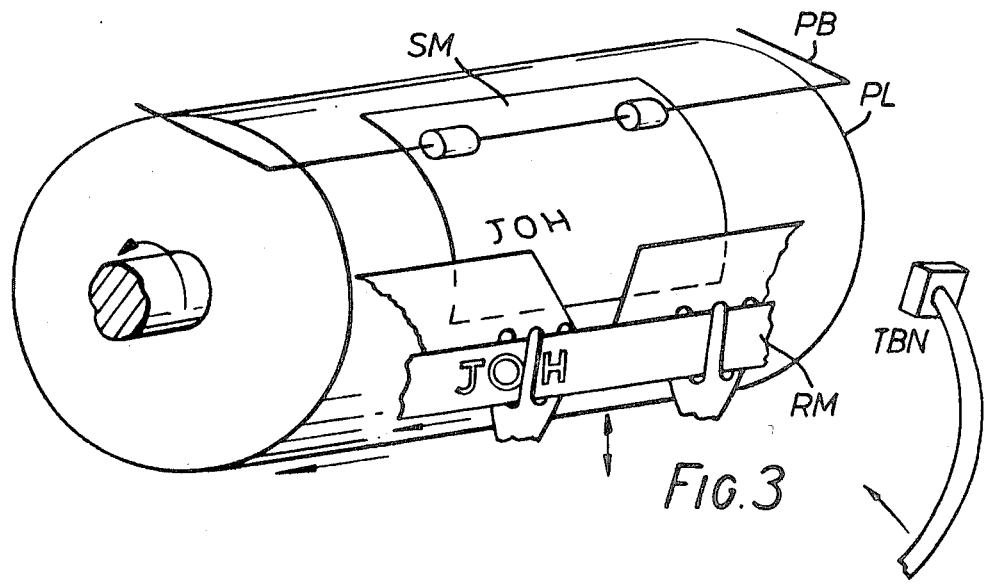
FIG. 3 shows recording in progress.

One form of recording apparatus is shown at FIG. 2, and in part detail in FIG. 3. A type basket TB equipped with alpha-numeric or other suitable type faces is positioned so that individual type elements can be operated to strike a piece of medium RM in tape form against a piece of support material SM held on a platen PL by suitable means such as a bail PB. The tape is moved from reel R1 to reel R2 and in a preferred form the take-up reel R2 is driven by a stepping motor MS via toothed belt B in synchronism with the type-bars, moved by suitable means, to provide fresh medium for each character. Suitably the type-bars are operated by electrical signals supplied to a synchronising circuit SYN which directs the electrical signals to operate the respective type-bar and move the medium and platen. The electrical signals may be five or more level code signals of known form supplied, eg from a punched tape reader, over the input connection INPUT. Clearly a hand-struck type basket can be used with suitable transport means. The platen PL is also driven by suitable means, eg toothed belts PD and pulleys PY to move the piece of support material SM to space the characters. The type faces to strike the recording medium are heated, eg by infrared radiators IRH placed around the type basket. Suitable power sources S1, S2, S3 are also provided. In operation a selected type bar is operated to strike a heated type character shape against the medium on the support material SM to heat the medium in the shape of the character to release the shaped portion of magnetic material and press it onto the support material to adhere thereto as a magnetisable body 41 in the character shape. The medium is then stepped on for the next character. FIG. 3 also shows the recorded medium bearing visible characters which also form corresponding magnetisable shapes. The type bar TBN carrying the heated die for the next letter, —N," is about to strike the tape RM against the support SM on the platen PL.

Clearly other methods of heating the medium in the shape of the data to be recorded are possible. For example radio frequency heating using the shape of the type element to determine the heated area is possible. The form of the data can be chosen as desired and in addition to characters arbitrary shapes and binary data bars can be used, for example the ASCII code format. Also the medium RM may be coated with material in a fine dot pattern to ensure clean edge release of any character form chosen.

Figure 4:
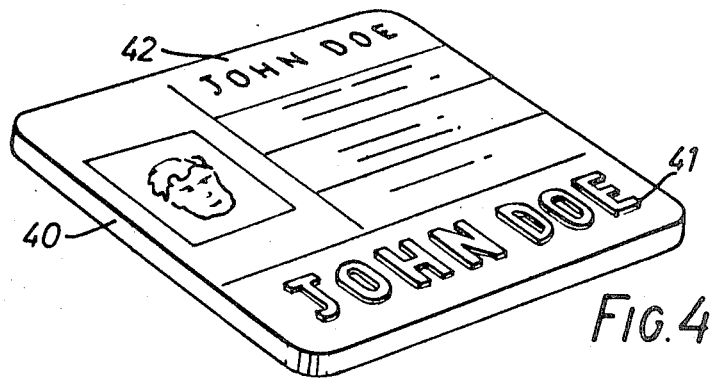
FIGS. 4 and 6 show recorded recording media in operative secure document arrangements.
Figure 6:
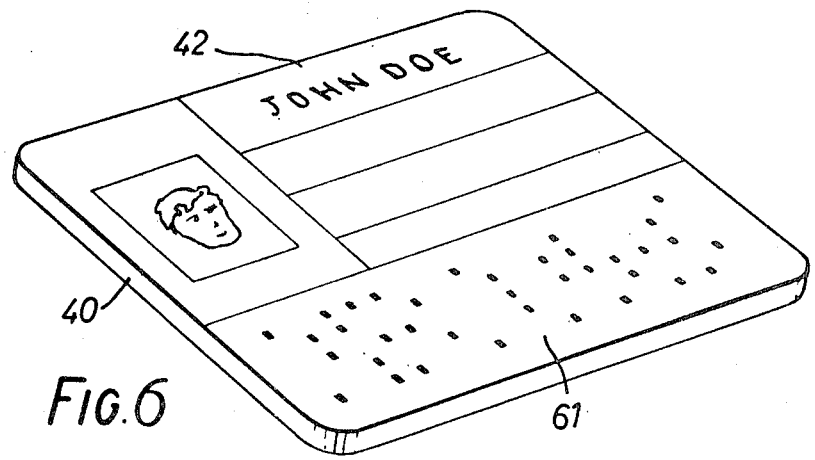

FIG. 4 shows an identity or like card 4 on which the material 41, released as shown in FIG. 3, has been secured, as indicated by the exaggerated projection of the material from the surface, on a support 40. The recorded indicia 41, JOHN DOE, is repeated on the card at 42 in conventional printing. FIG. 6 shows a similar card with a code format indicated at 61.

The authenticity of the card is indicated visually in one way by the correspondence of the magnetisable character and the conventionally printed information.

In one preferred form the recording is in the form of alphanumeric characters formed by elements of a dot matrix, eg a 7×5 element matrix. Such a matrix provides visible readily legible characters and also a magnetic pattern readily detectable by a magnetic reading head.

Figure 5:
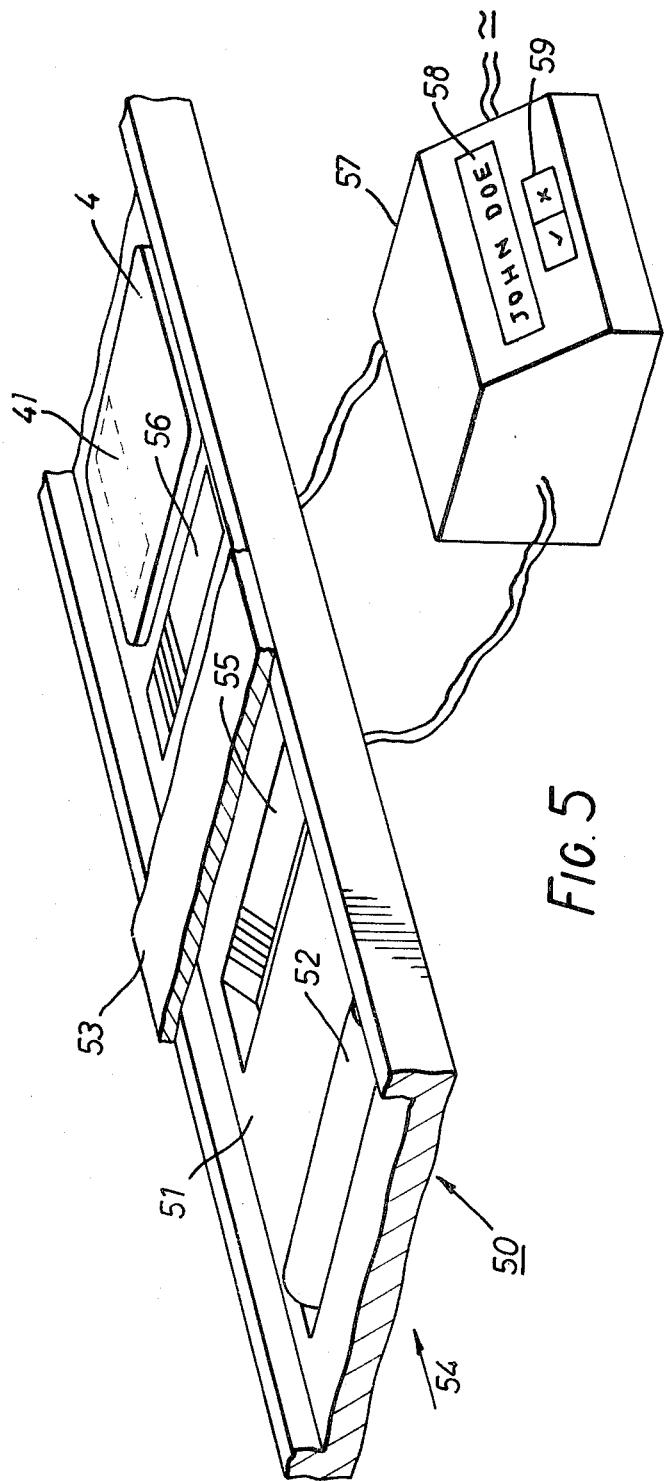
FIG. 5 shows a reading apparatus.

FIG. 5 shows an apparatus to read the visible and magnetic forms.

A card transport means 50 of any suitable form, eg a channel 51 with one or more powered card drive rollers 52 and a cover plate 53 to keep cards down on the bottom of the channel, is provided and supported in suitable manner, as is well-known in the art. A card, such as card 40 of FIG. 4, is inserted face down along the direction of arrow 54 and transported up to and past an optical reading station 55 and a magnetic reading station 56. Each station contains respective sensors of suitable form to read the visible and magnetic recording on adjacent record 41 of card 40. When the 7×5 format is used five sensors at each station can be used to detect the condition of the five elements in one column at a time during transport of the record 41 on card 4 past them. (Clearly a source of illumination, not shown, may be required for the optical sensors). The electrical signals from the sensors are supplied to a comparator and display means 57 which displays the magnetically recorded information at 58 and at 59 indicates agreement (a tick) or lack of agreement (a cross) of the visible and magnetic record. The card is ejected after reading.

Suitable electronic circuits for reception, storage and comparison of the signals from the sensors and the display of the result are well-known and will not be described further.

The record medium described above and shown in FIG. 1 has a layer 11 of magnetic material the whole of which is usable for the recording of information. If desired the medium may have a layer in two or more side-by-side longitudinal parts, each of different magnetic form. The parts would be selectively used for recording information in the manner of a two-colour typewriter ribbon, but preferably the differences would not be apparent to the unaided eye. For example one part would have anisotropic particles aligned lengthwise of the medium and another part such particles aligned crosswise of the medium. The different alignments would be detectable by a suitable reading apparatus as an authenticity check. In a similar manner a medium of a layer of a magnetisable material having throughout a pattern of a magnetic property of the material, as described in U.K. Pat. No. 1,331,604, could be used as a source of the characters and the characters checked for the presence of the pattern.

Other magnetisable materials formulated for easy clean release in a desired shape may be used, eg gamma iron oxide or cobalt doped iron oxide as well as thin metal films. The release of shapes from a source of material having a magnetic pattern permits checking against the retained source, which is not possible with a printed pattern as described in U.S. Pat. No. 3,998,160.

Figure 7:
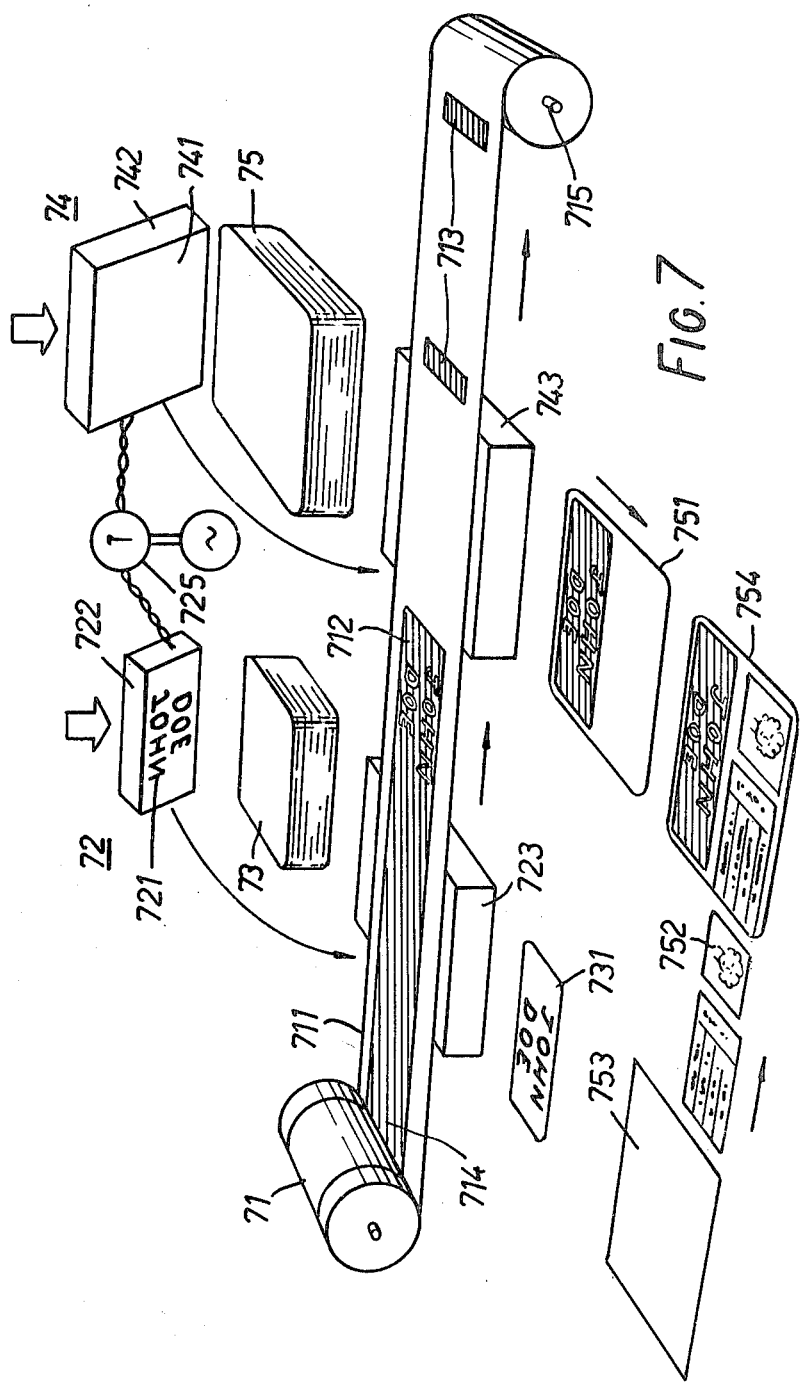
FIG. 7 shows in schematic form a process for making a secure document.

FIG. 7 shows the manufacture of a secure document and an associated checking document.

A roll 71 of a plastics web 711 coated with a layer 714 of an anisotropic magnetisable material, e.g. acicular gamma iron oxide, having a permanent structural pattern of a magnetic property, e.g. remanence, is prepared in a suitable manner, e.g. as described in U.K. Pat. No. 1,331,604. The pattern represents information, e.g. origin of the coated web, and provides a clock pulse source. Typically the pattern is a bar code (e.g. of the F/2F code form) across the width of the coated web. The web 711 from roll 71 is passed through stations 72 and 74 to a take up point 715 with the layer 714 on the underside. On the way alpha-numeric forms are transferred from the layer to a support, 731, and the remaining material, 712, of the layer transferred to a carrier 75 to form a secure document carrying information. In detail, at station 72, type 721 representing the information to be provided on the finished document e.g. "JOHN DOE" is secured to a heatable mounting plate 722 which cooperates with a platen 723. A support, such as a plastics card of a PVA/PVC copolymer, from a stack 73 is placed on platen 723 and the heated type pressed down onto web 711 to cause material of layer 714 to transfer to the support on the platen in the form of the type. A support 731, when removed from the platen, will then carry the words "JOHN DOE" in the material of the layer against the support as a background. This forms a checking document.

The web 711 bearing the remaining material 712 is transferred to station 74 where a further heatable plate 742, with a flat surface 741, is provided to cooperate with a platen 74. Carriers for the document, e.g. cards of PVC/PVA plastics copolymer, from stack 75 are placed in turn on platen 743 and the portion of layer 714, such as 712, applied to an individual carrier by hot blocking in known manner. The carrier plus material, 751, will then show the information, JOHN DOE, as the surface of the carrier showing through apertures in the layer of material having the security feature, eg the pattern of bar code bars. The magnetisable material thus has the appearance of a stencil.

The web 711 with residual material 713 is taken up at 715. If required a further station, not shown, can be used to laminate a photograph, 752 and a clear cover layer 753, over carrier and information 751, producing a complete document 754, shown also in FIG. 7.

In an arrangement for small scale production, say one or two cards at a time, the stations 72 and 74 would be hand operated and electrically heated under control of timer 725. The type 721 would be hand assembled into a jig (not shown). Pressure of some 30 lbs for a few (2–3)

seconds is required for material transfer. For large scale production an automatic arrangement using e.g. punched-tape controlled heated type and mechanised preparation and assembly of the document parts would be used. Techniques as described above are suitable.

In use of the document the information can be read by suitable optical and/or magnetic head while the presence of the pattern can be checked for by magnetising the layer of material and searching for remanence variations. The pattern is also read if required as a further check on authenticity. Examining apparatus as described for FIG. 5 with any appropriate modifications is suitable.

Figure 8A:
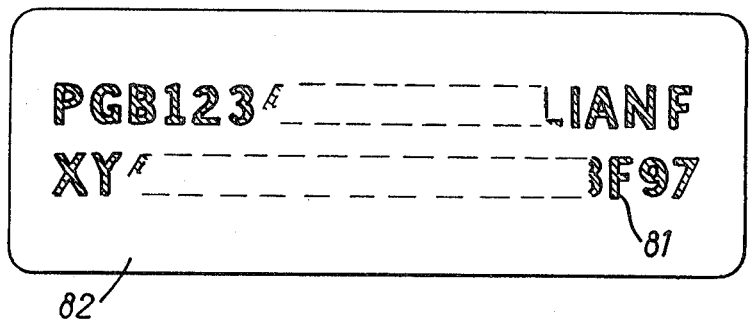
FIGS. 8a, 8b and 8c show a secure document and associated check document.
Figure 8B:
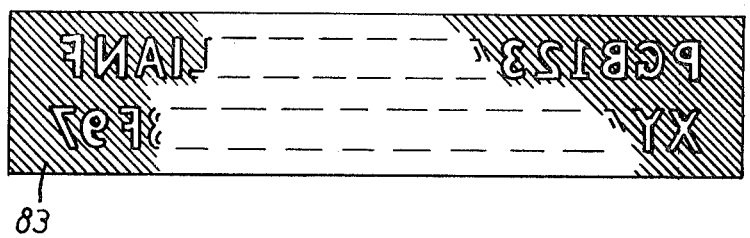
Figure 8C:
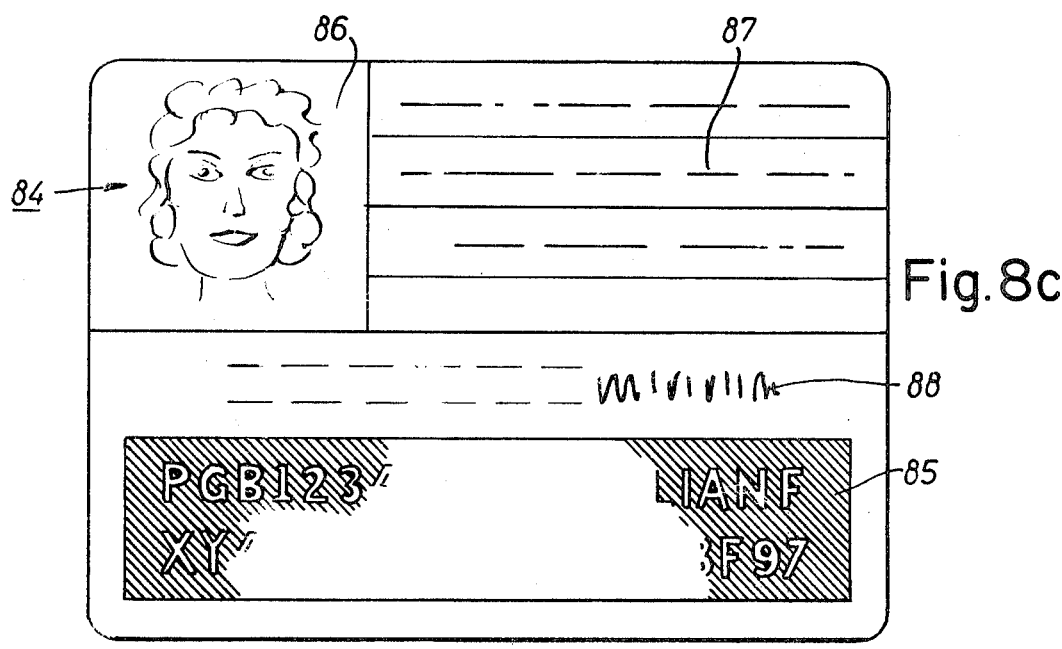

In one application the secure document is a passport and the carrier a plastics card some 5"×4" (10×12 cm). FIGS. 8a, 8b and 8c show such a passport and stages in its making.

The material initially released, shown at 81 in FIG. 8a, is on a plastics support 82 and forms a check record document, which can be filed away if required at the issuing office. The tape 83 shown in FIG. 8b, with parts removed, is attached to passport card 84, shown in FIG. 8c, at 85. A photograph, 86, printed details, 87 and a signature 88, are also applied and the whole over-laminated with clear plastic film. When presented the passport card is magnetised and examined for the security feature.

Full examination by comparison with the check record document is also possible.

In addition to the pattern the layer could carry more details, e.g. tracks of permanently recorded information and even a visibly textured background. The carrier could be printed with a suitable colour to enhance the contrast of the carrier visible through the layer.

The techniques described above are suitable for large or small scale production of secure documents, without requiring great skill from operators while security is preserved by controlling the supply and use of the magnetically coated material. The documents produced have the further advantage that the securely recorded information can be eye-visible. If the documents are altered, even using suitably coloured material, it is not possible to match the remanence pattern or other security feature thus fraud is relatively easily detected. The techniques described provide a recording medium and operative system resistant to fraudulent alteration which is suitable for the production of individual security devices in which the individual information can have a wide range of content and is easily applied. If required the security device, such as the card, can be encapsulated to protect it. The security material may be applied over part of the photograph as a guard against a different photograph being applied.

What I claim is:

1. A method of applying security material to a support in a form which represents information including
   providing a source of selectively releasable security material having a security feature of a detectable pattern of a magnetic material property,
   applying a data recording element to the security material source to release material from the source in the form of said element,
   securely bonding at least one of the released material form and the matching remaining material form in the source to a respective support,
thereby to produce a secure document having data securely represented by the material form on the support, the material itself including said security feature.

2. A method according to claim 1 including bonding the released form to a checking document support and bonding the remaining material to a secure document support.

3. A method according to claim 1 including applying heat with the application of the data recording element to release material from the source.

4. A method according to claim 3 including applying heat from the data recording element.

5. A method according to claim 4 including bonding the form by hot blocking.

6. A method according to claim 1 including making a magnetic recording with the data recording element when releasing material from the source.

7. A method according to claim 1 including providing said source as a layer of magnetisable material having magnetically anisotropic particles in a set binder on a carrier the easy axis of magnetisation of the particles being aligned in selected areas of the layer in a distinct selected direction, the selected directions forming a remanence variation pattern which is the security feature.

8. A method according to claim 1 including providing a plurality of data recording element forms representing a group of distinct shapes the group including at least one of alphanumeric shapes, arbitrary data shapes, character shapes and graphic shapes.

9. A secure document including a layer of magnetisable material having a security feature, the layer of magnetisable material having at least one aperture of alpha-numeric character form representing information securely recorded on the document, the magnetisable material layer security feature including a detectable pattern of a magnestisable material property fixed in the layer, and the character form being both eye visible and magnetically detectable as a check against alteration of the information.

10. A secure document according to claim 9 including a further eye-visible information record of the information securely recorded.

11. A secure document recording apparatus including means to transport a support material and a security material source through the apparatus to a recording location, means to apply a distinct shape to the security material source at said location, means to heat the source in the region of said shape and release, transfer and attach material from the source to the support in said shape and means to transport the support and attached material shape from said location.

12. An apparatus according to claim 11 including means to attach to the support material having apertures which have the distinct shaoe to represent information.

13. A secure document of a support and secured thereon a body of security material of a layer of anisotropic magnetisable material having fixed therein a detectable pattern of the anisotropic property of the material, said layer having a form which represents information both in magnetically detectable and eye visible manner.

14. A secure document according to claim 13 in which the form representing information is eye-readable and is at least one of alpha-numeric character forms and other graphic forms.

15. A secure document according to claim 14 in which a form is defined by the shape of at least one separate security material part against the support.

16. A secure document according to claim 14 in which a form is defined by the security material around at least one aperture therein which shows the support.

17. A secure document according to claim 13 in the form of a passport or identity card in which the information which is represented in an eye visible manner is the name and other details of the individual entitled to the passport or card.

18. A passport or identity card according to claim 17 including a photograph of the individual which photograph is partly overlaid by the body of security material to guard against substitution of another photograph.

19. A secure document system comprising a first document of a support and fixed thereto and eye visibly distinct therefrom, a first body or bodies of anisotropic magnetisable material, which first body or bodies is or are shaped to represent information which is thereby both magnetically and eye visibly detectable, and a second document of a further support having everywhere fixed thereto a body of anisotropic magnetisable material except for regions having the same shape, size and relative disposition, as the first body or bodies of anisotropic magnetisable material on the said support.

* * * * *